July 3, 1928.

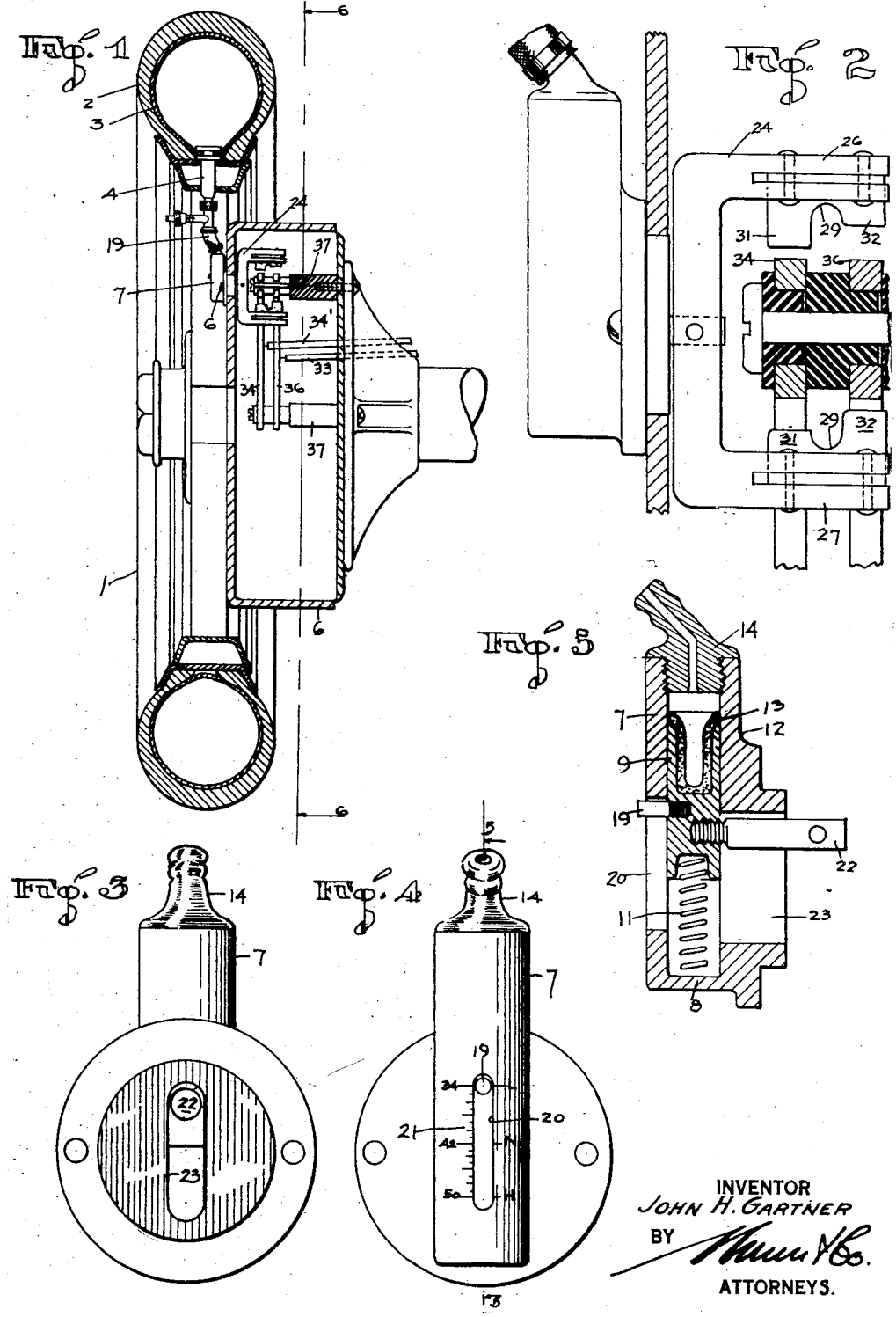

J. H. GARTNER 1,675,410

PRESSURE INDICATING DEVICE

Filed Feb. 15, 1927

2 Sheets-Sheet 2

INVENTOR
JOHN H. GARTNER
BY
ATTORNEYS.

Patented July 3, 1928.

1,675,410

UNITED STATES PATENT OFFICE.

JOHN H. GARTNER, OF SAN FRANCISCO, CALIFORNIA, ASSIGNOR OF ONE-FIFTH TO PATRICK S. HIGGINS, ONE-FIFTH TO JAMES D. SKELLY, AND ONE-FIFTH TO WILLIAM SHACKLETON.

PRESSURE-INDICATING DEVICE.

Application filed February 15, 1927. Serial No. 168,373.

The present invention relates to improvements in pressure indicating devices and has particular reference to a device for indicating the pressure within a tire to the driver of a motor vehicle while the vehicle is in motion. It is particularly proposed to arrange for this purpose a series of lamps in such a manner that one or more of them light when the pressure in one or more tires changes from normal beyond a predetermined degree.

It is further proposed to provide a novel switch arrangement causing a lamp assigned to a particular tire to become active when the said tire is either under or over inflated.

It is further proposed to subject one of the elements of the switch mechanism to the direct action of the pressure within the tire.

It is further proposed to provide a switch arrangement of the character described, one part of which is secured relative to the vehicle frame while the other part is secured relative to the wheel and revolves with the same.

It is further proposed to provide a switch mechanism that under these circumstances makes a smooth continued wiping contact and is noiseless and little subject to wear.

Further objects and advantages of my invention will appear as the specification proceeds.

Figure 6:
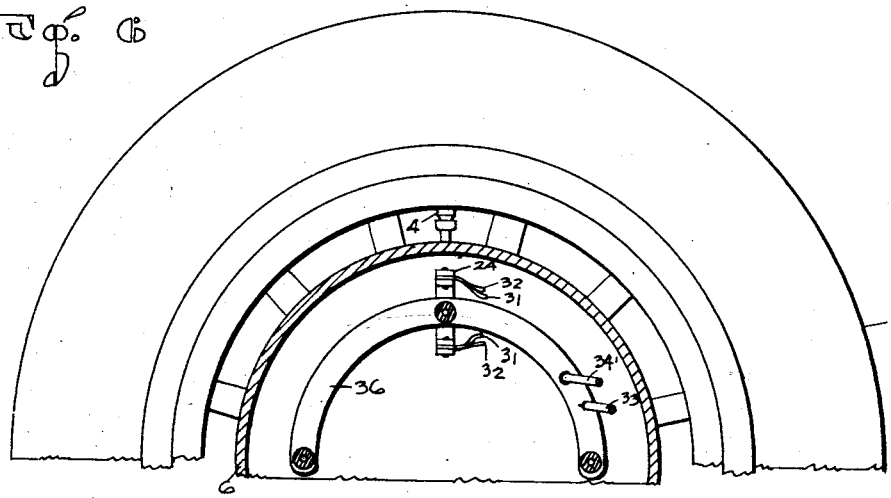
Figure 8:
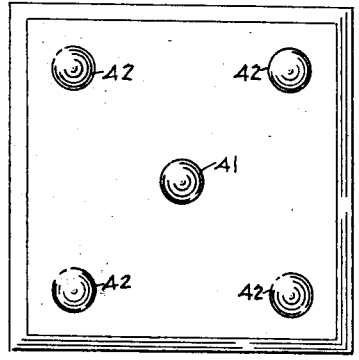
Figure 7:
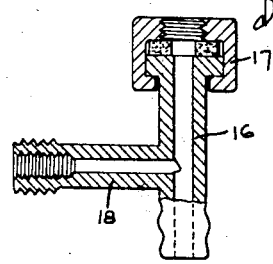
Figure 9:
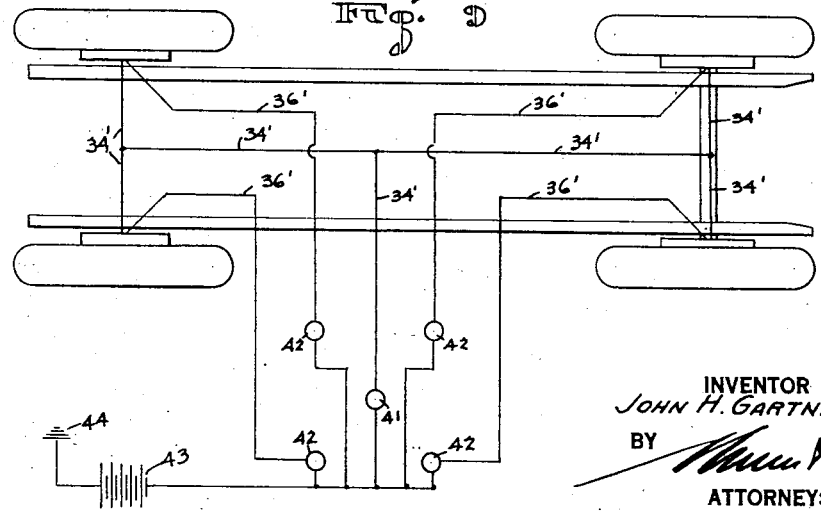

The preferred form of my invention is illustrated in the accompanying drawing, in which Figure 1 shows a vertical section through a wheel and adjacent portions of a motor vehicle with my pressure actuated switch mechanism secured thereto;

Figure 2 an enlarged detail view of the switch mechanism viewed as in Figure 1;

Figure 3 a rear view of the actuating mechanism for the movable switch member;

Figure 4 a front view thereof;

Figure 5 a vertical section through the same as viewed from line 5—5 of Figure 4;

Figure 6 a view of the switch mechanism as seen from line 6—6 of Figure 1;

Figure 7 a sectional detail view of a joint interposed between the ordinary valve and the actuating means for my switch mechanism;

Figure 8 a view illustrating the arrangement of lamps adapted to give various indications relative to the pressure in the tire; and Figure 9 a wiring diagram.

While I have shown only the preferred form of the invention, it should be understood that various changes or modifications may be made within the scope of the claims hereto attached without departing from the spirit of the invention.

The wheel 1 of a motor vehicle may be constructed in any suitable manner and is provided with a tire 2, and an inner tube 3 adapted to be inflated through a valve 4 of conventional construction. For the purpose of the present invention it is assumed that the wheel has a brake drum 6 fixed thereto, it being understood, however, that the brake drum does not form a necessary part of the invention, since any other supporting element may serve the same purpose. Fixed to the outer face of the brake drum by means of screws 6 is a cylinder 7 shown in detail in Figure 5, the cylinder being closed at one end as at 8 and having a piston 9 reciprocably mounted therein, a spring 11 being interposed between the end 8 and one end of the piston, while the opposite end of the piston is formed with a pocket 12 into which is introduced a rubber cup 13 bearing against the inner face of the cylinder and forming an airtight seal when subjected to a pressure of the tire through the perforated cap 14 communicating with the valve 4. In order to allow of free communication between the tube 3 and the upper face of the piston 9 I remove the conventional Schrader valve and introduce what is known as Schrader's universal connection illustrated in detail in Figure 7, providing a short tube 16 adapted to be fastened to the valve 4 by means of a coupling 17, and provided with a lateral arm 18 into which a conventional valve, not shown, may be introduced. The lower end of the tube 16 may be connected to the upper end of the cylinder 7 through a flexible tube 19.

It will be seen that the position of the piston 9 within the cylinder 7 indicates the pressure within the tire and a pointer 19 extends laterally from the piston through a slot 20 in the cylinder wall, which latter is provided with a suitable scale 21 allowing the pressure to be read. When the pressure is low the pointer 19 will be in a position as shown in Figures 4 and 5, and when the pressure increases to normal the piston will compress the spring 11 and move to the middle of the slot. As the pressure increases beyond normal the piston moves down still further and the pointer 19 moves to the bottom of the slot, it being assumed for the purpose of the present description that a pressure of 42 stands for normal, of 34 for low and of 50 for high.

A second element or arm 22 extends from the piston in the opposite direction and is adapted to ride in a slot 23 formed in the wall of the cylinder. This arm carries at its end a yoke 24 illustrated in detail in Figure 2, the prongs 26 and 27 of the yoke being arranged to lie in a single radial plane. Each of the prongs carries a spring contact 29 and each contact presents two wiping arms 31 and 32, spaced slightly different relative to the axis of rotation.

Fixedly mounted relative to the axle housing 33 are two semi-circular contacts 34 and 36, the same being supported on short posts 37 so as to be insulated from the housing. The two semi-circular contacts are mounted so as to be straddled by the two prongs 26 and 27 of the yoke, and to be normally cleared by the spring contacts 31 and 32 but to be engaged by the latter when the yoke moves radially in one direction or the other in response to changes in tire pressure.

The operation of the unit thus far described will be readily understood from the foregoing description.

The upper face of the piston 9 is directly subject to the action of the pressure within the tire and occupies normally a midway position so that the pointer 19 is substantially in the middle of the slot 20, opposite the letter N.

As long as the piston occupies this position the yoke and the spring contacts thereof clear the stationary contacts 34 and 36. But when the pressure in the tire changes, either increasing or decreasing the piston moves radially in one direction or the other, causing the yoke to move correspondingly and causing either the upper spring contacts or the lower spring contacts to successively engage the two arc shaped contacts 34 and 36, according to the intensity of the change. If there is, for instance, a slight increase the spring contact 31 engages the semi-circular contact 34 and when the pressure further increases the second spring contact 32 engages the arm 36. Correspondingly on a decrease of pressure the arms 32 and 31 of the lower prong of the yoke successively engage the stationary contacts 36 and 34.

The switch mechanism hereinabove described may be utilized for giving the alarm signals in the manner illustrated in the wiring diagram of Figure 9, in which one central lamp 41 is surrounded by four lamps 42. Assuming that the four spring contacts 31 and 32 are grounded, that the stationary contact 34 of each wheel is connected through the wire 34', through the central light 41 to the battery 43 and the ground 44 and that the stationary contacts 36 of the four wheels are connected through wires 36' and the four lamps 42 respectively to the battery 43 and the ground, the operation will be as follows: When the yoke moves centerwise in response to increase in pressure the upper two spring contacts 31 and 32 successively engage the stationary contacts 34 and 36, first lighting the central lamp 41, thereby advising the driver that one or more tires are over-inflated and then lighting one of the lamps 42, thereby informing the driver which particular one of the tires is over-inflated, and also indicating that the over-inflation is so intense as to be dangerous. If the yoke moves outwardly in response to lack of pressure the two lower spring contacts 32 and 31 successively engage the wires 36 and 34, the first engagement lighting one of the lights 42, thereby informing the driver that one of the tires is under-inflated, and also identifying the tire, while the second engagement informs the driver that the tire is substantially flat. It will be noted that the succession is reversed for under-inflation, so that the driver may ascertain from the sequence of the operation whether the tire in question is under or over inflated.

I claim:

1. In means for indicating the pressure in the tire of a moving vehicle, an arc-shaped contact fixed relative to the vehicle adjacent a wheel thereof, a wiping contact supported relative to the wheel and operating means for the wiping contact subject to the pressure in the tire and arranged to keep the latter contact spaced from the former at normal tire pressure, and to effect engagement of the contacts when the tire pressure changes beyond a predetermined point.

2. In means for indicating the pressure in the tire of a moving vehicle, an arc-shaped contact fixed relative to the vehicle adjacent a wheel thereof, a wiping contact supported relative to the wheel, a radial cylinder having a piston resiliently movable therein, means for subjecting the piston to the action of the pressure within the tire and an operative connection between the piston and the wiping contact causing the latter to engage the arc-shaped contact when the pressure in the tire is other than normal.

3. In means for indicating the pressure in the tire of a moving vehicle, an arc-shaped contact fixed relative to the vehicle adjacent a wheel thereof, a yoke supported relative to the wheel to straddle the arc-shaped contact and having wiping contacts above and below the former contact, a cylinder on the wheel having a piston resiliently mounted therein, means for subjecting the piston to the pressure within the tire causing the piston to move in response to changes in the tire pressure and an operative connection between the piston and the yoke causing the latter to move with the former for operating the wiping contacts.

4. In means for indicating the pressure in the tire of a moving vehicle, two parallel arc-shaped contacts fixed relative to the vehicle adjacent a wheel thereof, a yoke supported relative to the wheel to straddle the arc-shaped contacts having wiping contacts for each of the arc-shaped contacts below and above the same, means for operating the yoke in response to changes in tire pressure for engaging either the lower or the upper wiping contacts with the arc-shaped contacts, the upper and the lower contacts being differently spaced from the arc-shaped contact to become active at different tire pressures.

5. In means for indicating the pressure in the tire of a moving vehicle, an arc-shaped contact fixed relative to the vehicle adjacent a wheel thereof, a wiping contact supported relative to the wheel and means for operating the latter is response to changes in tire pressure for engaging the former when the tire pressure departs from normal.

JOHN H. GARTNER.